US007926249B1

(12) United States Patent
Cook

(10) Patent No.: US 7,926,249 B1
(45) Date of Patent: Apr. 19, 2011

(54) TRANSPORT SYSTEM FOR A HARVEST HEADER

(75) Inventor: Joel Timothy Cook, Lititz, PA (US)

(73) Assignee: CNH America LLC, New Holland, PA (US)

( * ) Notice: Subject to any disclaimer, the term of this patent is extended or adjusted under 35 U.S.C. 154(b) by 0 days.

(21) Appl. No.: 12/620,082

(22) Filed: Nov. 17, 2009

(51) Int. Cl.
*A01B 73/00* (2006.01)
(52) U.S. Cl. .......................................... 56/228; 172/240
(58) Field of Classification Search .................... 56/228, 56/14.9; 172/240, 241, 242, 243, 244, 311; 280/413, 412, 415.1
See application file for complete search history.

(56) References Cited

U.S. PATENT DOCUMENTS

| | | | |
|---|---|---|---|
| 2,421,772 A | | 10/1943 | Brundage |
| 2,833,105 A | * | 5/1958 | Naery ............................. 56/228 |
| 3,665,688 A | | 5/1972 | Sheehan et al. |
| 4,360,215 A | * | 11/1982 | Nohl et al. ..................... 280/413 |
| 4,364,581 A | * | 12/1982 | Shoup ............................ 172/311 |
| 4,384,445 A | * | 5/1983 | McIlwain ....................... 56/228 |
| 4,442,662 A | | 4/1984 | Jennings |
| 4,446,926 A | | 5/1984 | Hoaglen |
| 4,573,309 A | | 3/1986 | Patterson |
| 4,721,168 A | * | 1/1988 | Kinzenbaw .................... 172/311 |
| 4,831,814 A | | 5/1989 | Frisk et al. |
| 4,971,154 A | | 11/1990 | McKemie |
| 4,986,064 A | | 1/1991 | Ermacora |
| 5,199,252 A | * | 4/1993 | Peeters ........................... 56/377 |
| 5,243,810 A | * | 9/1993 | Fox et al. ........................ 56/228 |
| 5,361,569 A | * | 11/1994 | Schupman et al. ............. 56/228 |
| 5,374,082 A | * | 12/1994 | Smith ........................... 280/789 |
| 5,660,237 A | * | 8/1997 | Boyko et al. .................. 172/311 |
| 5,867,970 A | * | 2/1999 | Ehrhart et al. ...................... 56/6 |
| 6,152,240 A | | 11/2000 | Nonhoff et al. |
| 6,209,297 B1 | | 4/2001 | Yeomans et al. |
| 6,758,284 B2 | * | 7/2004 | Myers ............................ 172/311 |
| 7,162,854 B2 | | 1/2007 | Yeomans et al. |
| 7,197,865 B1 | * | 4/2007 | Enns et al. ...................... 56/228 |
| 7,347,277 B2 | * | 3/2008 | Enns et al. ..................... 172/311 |
| 2008/0086999 A1 | | 4/2008 | Tippery et al. |

FOREIGN PATENT DOCUMENTS

EP          0608183 A1      7/1994

* cited by examiner

*Primary Examiner* — Árpád Fábián-Kovács
(74) *Attorney, Agent, or Firm* — Michael G. Harms; Patrick M. Sheldrake

(57) ABSTRACT

A harvest header includes a transport system for converting the harvest header between a harvesting configuration and a transport configuration. The transport system may be retrofitted to existing headers or may be integrally constructed with a header. The transport system includes wheels that are retracted or rotated into a compact storage position against the rear wall surface of the header in a harvest configuration so as not to substantially increase the width of the header.

13 Claims, 10 Drawing Sheets

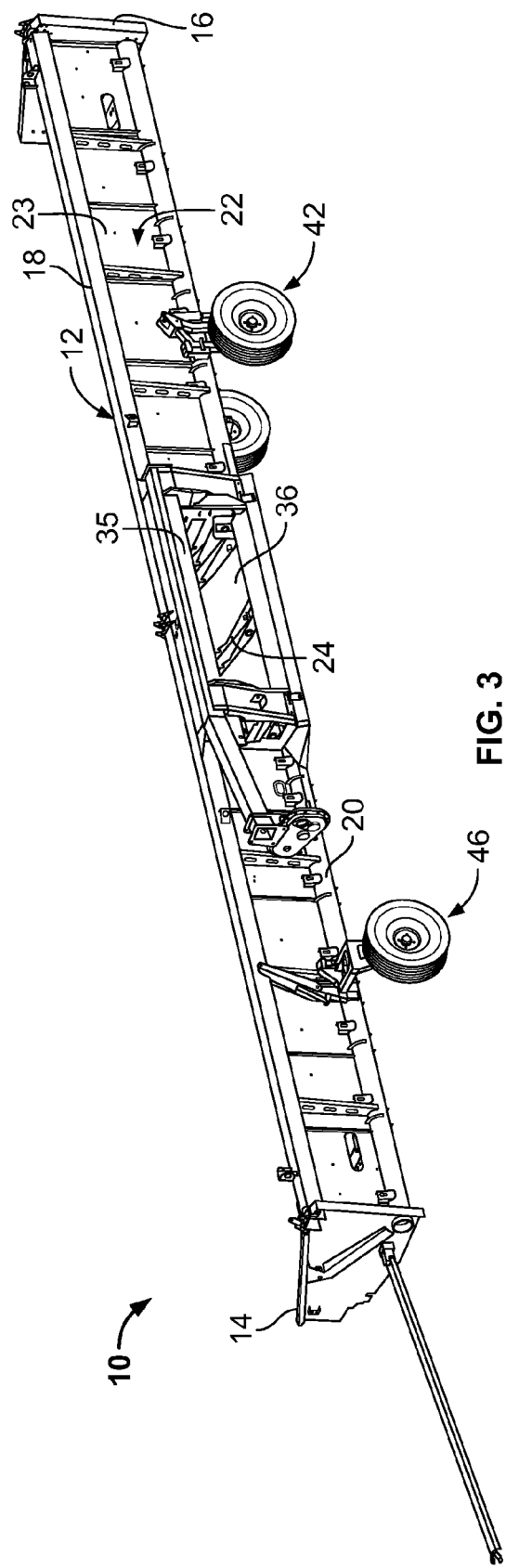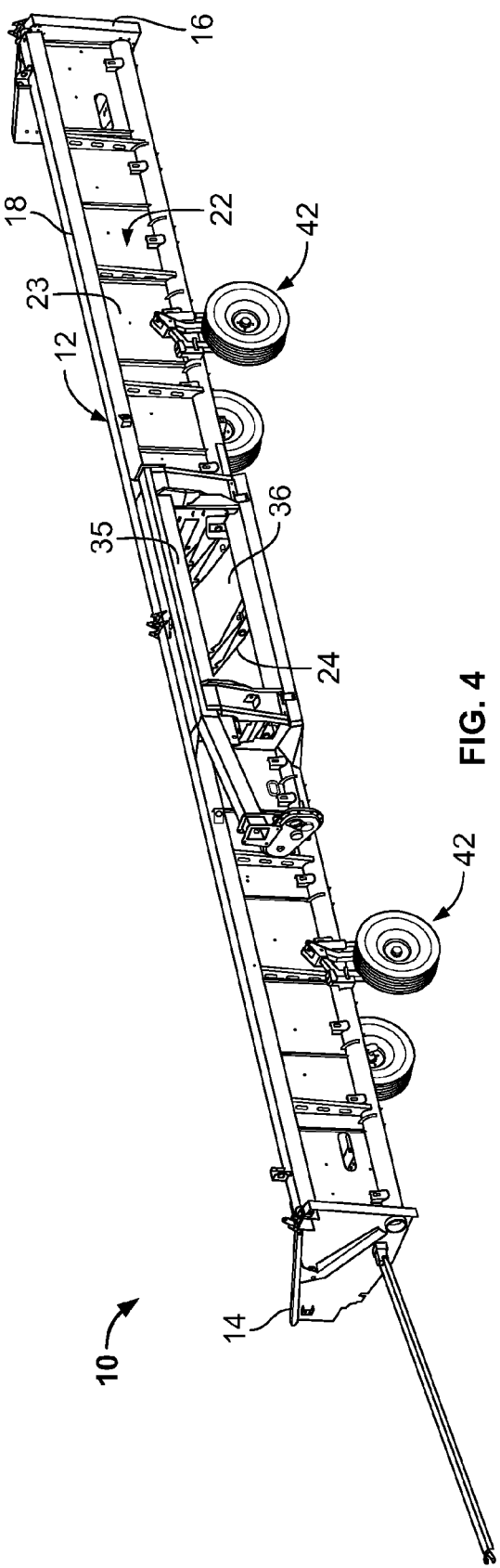

TRANSPORT SYSTEM FOR A HARVEST HEADER

FIELD OF THE INVENTION

The present invention relates generally to crop gathering devices. It relates more particularly relates to an integral transport system for harvest headers.

BACKGROUND OF THE INVENTION

To increase harvesting efficiency, harvesters, such as combines, have increased in size and capacity. With this increase in capacity, the detachable header attached to the combine for picking a crop has increased in size as well. The increased size of the header has resulted in transportation difficulties in moving the header from field to field. In many instances, larger headers must be transported down roads lengthwise. Most operators use a separate trailer to transport these headers. The operator is required to purchase and maintain a separate piece of trailer machinery, and the header must be returned to the trailer or the trailer brought to the header for transport.

Some operators have provided for headers that include wheels that can be attached for transportation and detached for operation. However, wheels can be heavy and difficult to remove and reattach.

There is a needed for an improved header that includes integral wheels for transportation.

SUMMARY OF THE INVENTION

The present invention relates to a harvest header having a harvest configuration and a transport configuration. The harvest header includes a first end, a second end, a frame extending between the first end and the second end, a rear wall supported by the frame and extending between the first end and the second end, and a wheel assembly attached to the frame. The wheel assembly includes a first wheel component, a second wheel component, and an attachment structure for attaching the first wheel component and the second wheel component to a frame. The first wheel component includes a first swing arm having a first end attached to a first wheel and a second end pivotally attached to the attachment structure at a first attachment point, and a first linkage comprising a first end pivotally attached to the first swing arm and a second end pivotally attached to the rear member. The second wheel component includes a second swing arm having a first end attached to a second wheel and a second end pivotally attached to the rear member at a second attachment point, and a second linkage comprising a first end pivotally attached proximate the second end of the second swing arm and a second end pivotally attached to the rear member. The first wheel component and second wheel component are configured to rotate about the first attachment point and the second attachment point, respectively, to position the first wheel and the second wheel, respectively, proximate the rear wall in a transport configuration The present invention further relates to a wheel assembly including a first wheel component, a second wheel component, and an attachment structure for attaching the first wheel component and the second wheel component to a frame. The attachment structure includes a rear member and a bottom surface. The first wheel component includes a first swing arm having a first end attached to a first wheel and a second end pivotally attached to the attachment structure at a first attachment point, and a first linkage comprising a first end pivotally attached to the first swing arm and a second end pivotally attached to the rear member. The second wheel component includes a second swing arm having a first end attached to a second wheel and a second end pivotally attached to the rear member at a second attachment point, and a second linkage comprising a first end pivotally attached proximate the second end of the second swing arm and a second end pivotally attached to the rear member. The first wheel component and second wheel component are configured to rotate about the first attachment point and the second attachment point, respectively, to position the first wheel and the second wheel, respectively, above the bottom surface when the second swing arm is rotated to a transport position The present invention further relates to a method of converting a harvest header from a transport configuration to a harvest configuration. The method includes storing a first wheel assembly by rotating a first wheel and a second wheel from a transport configuration to a stored position in a harvest configuration.

One advantage of the present disclosure is a header that can be converted between a harvesting configuration and a transport configuration.

Another advantage of the present disclosure is a header having wheels that remain on the header and do not need to be detached and reattached for harvesting and transport.

Another advantage of the present disclosure is a header having wheels that fold into a compact storage position along the rear of the header so as to not increase the width of the header from a harvest configuration.

Another advantage of the present disclosure is the elimination of a separate trailer system for transporting the header.

Yet another advantage of the present disclosure is a transport system that can be retrofitted to existing harvesters that allows for the header to be converted between a harvesting configuration and a transport configuration.

Other features and advantages of the present invention will be apparent from the following more detailed description of the preferred embodiment, taken in conjunction with the accompanying drawings which illustrate, by way of example, the principles of the invention.

BRIEF DESCRIPTION OF THE DRAWINGS

FIG. 3 is a rear perspective view of another embodiment of a harvest header of the present invention.

FIG. 4 is a rear perspective view of yet another embodiment of a harvest header of the present invention.

Wherever possible, the same reference numbers will be used throughout the drawings to refer to the same or like parts.

DETAILED DESCRIPTION OF THE INVENTION

Figure 1:
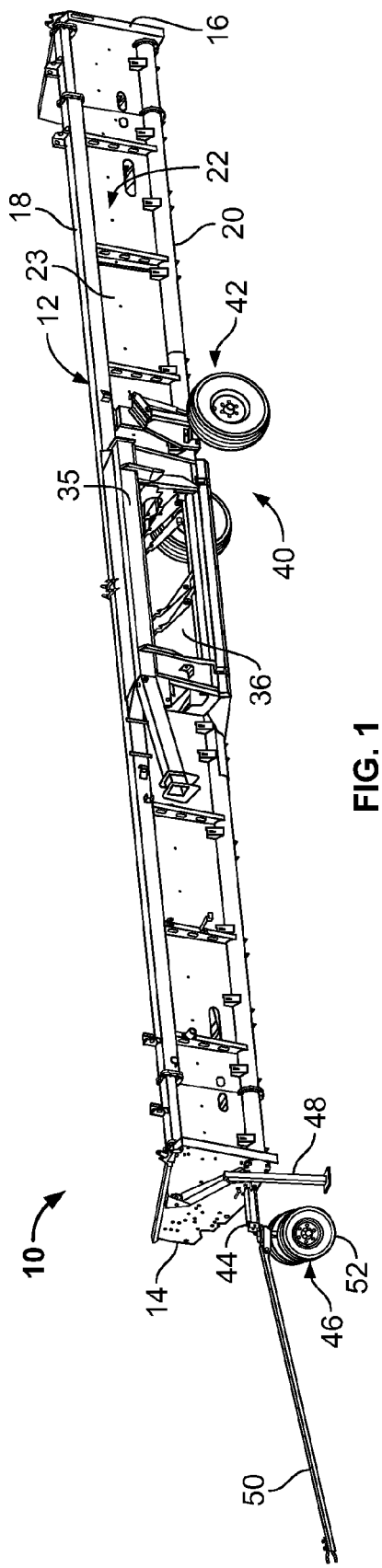
FIG. 1 is a rear perspective view of an embodiment of a harvest header of the present invention.

FIG. 1 shows an exemplary embodiment of a harvest header (header) 10 in a transport configuration. Header 10 may be secured to an agricultural vehicle such as a combine (not shown) as is known in the art and not further discussed. The harvest header 10 may include additional components such as, but not limited to a cutter bar and/or a reel (not shown). The header 10 includes a frame 12 that extends laterally between opposing first end 14 and second end 16. The first end 14 may be referred to as a lead tow end, since the first end 14 is attached closer to a towing vehicle (not shown) during transport. The second end 16 may be referred to as a trailing tow end, since this end is further away from any towing vehicle during transport. The frame 12 includes an upper beam 18 and a lower beam 20. In another embodiment, the frame 12 may includes an upper beam 18 or a lower beam 20.

The header 10 further includes a back sheet or rear wall 22 disposed between the upper beam 18 and lower beam 20 and generally supported by the frame 12. The rear wall 22 extends between the first end 14 and second end 16. The rear wall 22 includes an outside surface 23. The header 10 also includes an attachment frame 35 surrounding an opening 36 and extending rearward from the rear wall 22 for passing cut crop material rearward into a feeder house of a combine (not shown). In another embodiment, the attachment frame 35 does not extend substantially rearward from the rear wall, but is substantially in the plane of the frame 12. The frame 12 further includes bottom support components 24 that extend away from the lower beam 20. In another embodiment, the bottom support components 24 may extend away from the rear wall 12. The header 10 still further includes additional surfaces and supports, such as a cutter bar, which have been omitted for simplicity.

As further shown in FIG. 1, the header 10 includes an embodiment of the transport system 40 according to the present disclosure. The transport system 40 includes a wheel assembly 42 and a trailer attachment or trailer tongue 44. The transport system 40 is shown with an optional pivot wheel assembly 46, a stabilizer or jack stand 48, and trailer attachment extension or trailer tongue extension 50. In this exemplary embodiment, the wheel assembly 42 is shown disposed proximate the opening 36. In another embodiment, the wheel assembly 42 is disposed between the opening 36 and the second end 16.

The trailer tongue 44 may be fixed, detachable, or retractable underneath the frame 12 of the header 10. In this exemplary embodiment, the pivot wheel assembly 46 is attached to the trailer tongue 44 and is free to pivot around its vertical axis to assist in turning the header 10 during transport. The trailer tongue extension 50 is coupled to the trailer tongue 44, and may be used to reach a coupling or hitch that is located underneath a combine. In this exemplary embodiment, the pivot wheel assembly 46 includes a pair of wheels 52, however, in another embodiment, the pivot wheel assembly 46 may include one or more wheels 52. Still furthermore, in this exemplary embodiment, the jack stand 48 is attached to first end 14 of the header 10. In another embodiment, the jack stand 48 may be attached to the trailer tongue 44 or to the rear of the header (or to the frame 12).

Figure 2:
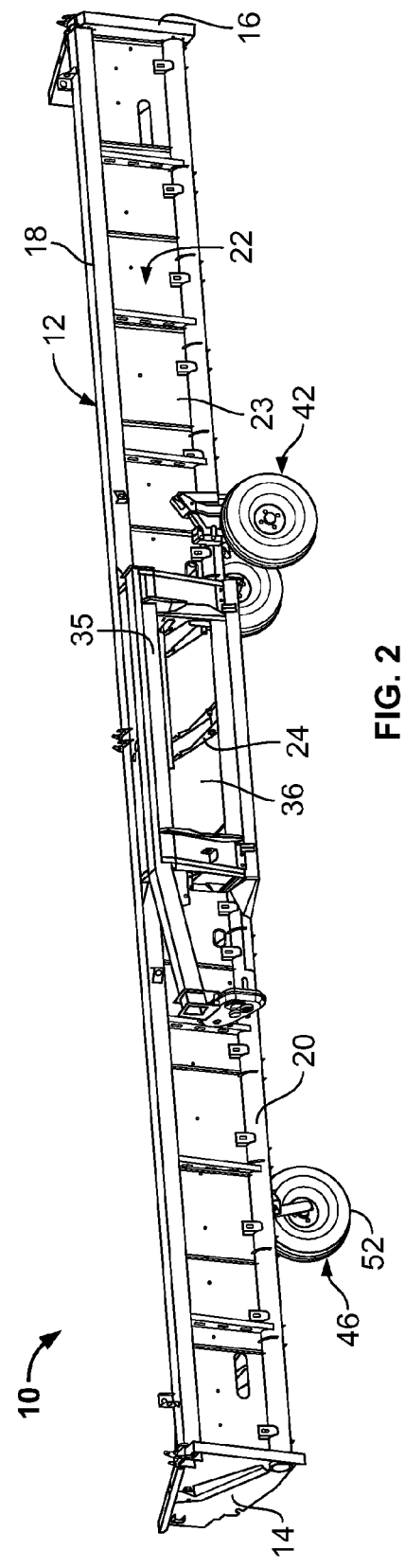
FIG. 2 is a rear perspective view of another embodiment of a harvest header of the present invention.

FIG. 2 shows another embodiment of the header 10 in a transport configuration. In this embodiment, the pivot wheel assembly 46 is releasably attached to a bottom support component (not shown) between the wheel assembly 42 and the first end 14. In this exemplary embodiment, the pivot wheel assembly 46 includes a wheel 52, however, in another embodiment, the pivot wheel assembly 46 may include one or more wheels 52. A similar bottom support component 24 can be seen through the opening 36. The bottom support component extends toward the front of the header 10 from the lower beam 20 toward the front of the header 10, and is similar to bottom beam 24 which can be seen through opening 36. In another embodiment, the pivot wheel assembly 46 may be releasably attached to the lower beam 20. In this exemplary embodiment, the pivot wheel assembly 46 is shown disposed proximate the midpoint between the opening 36 and the first end 14. In another embodiment, the pivot wheel assembly 46 is releasably attached to the lower beam 20. In another embodiment, the pivot wheel assembly 46 is disposed between the opening 36 and the first end 14.

FIG. 3 shows another embodiment of the header 10 in a transport configuration. In this embodiment, the pivot wheel assembly 46 is attached to the lower beam 20. The pivot wheel assembly 46 is configured to swing up and against the outside surface 23 of rear wall 22 when the header 10 is in a harvest configuration. The mechanism for swinging the pivot wheel assembly 46 into a position proximate the outside surface 23 will be described in further detail below in discussing the structure of the wheel assembly 42. In this exemplary embodiment, the pivot wheel assembly 46 is shown disposed proximate the midpoint between the opening 36 and the first end 14. In another embodiment, the pivot wheel assembly 46 is disposed between the opening 36 and the first end 14.

FIG. 4 shows yet another embodiment of the header 10 in a transport configuration. In this embodiment, the pivot wheel assembly 46 (FIG. 3) has been replaced by another wheel assembly 42. In this exemplary embodiment, a wheel assembly 42 is shown disposed proximate the midpoint between the opening 36 and the end 14. In another embodiment, a wheel assembly 46 is disposed between the opening 36 and the first end 14.

Figure 5:
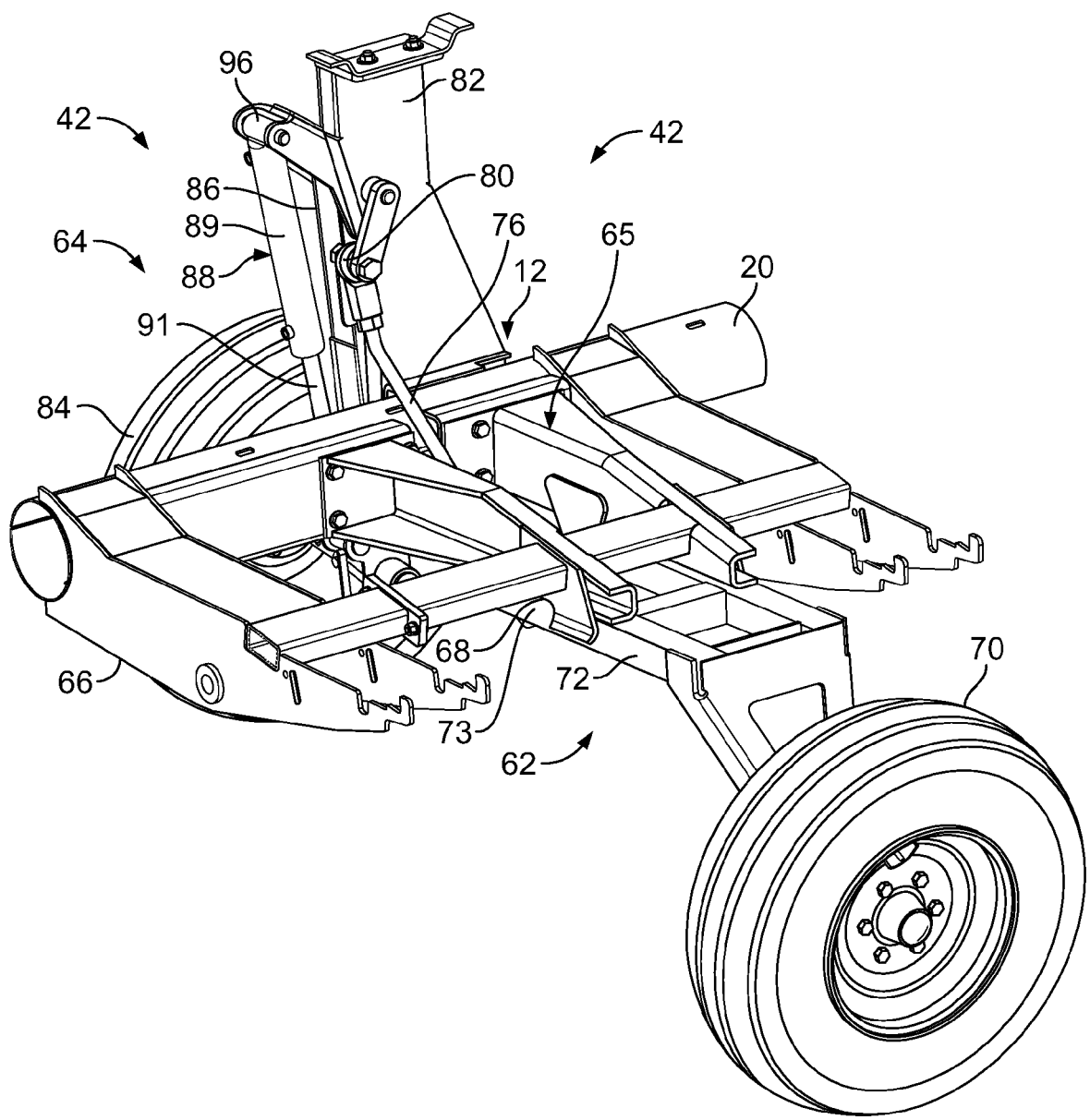
FIG. 5 is a partial cut away view of an embodiment of a wheel assembly of the present invention in a transport configuration.

FIG. 5 is a partial cut away view of FIG. 1 showing the wheel assembly 42 in a transport configuration. As can be seen in FIG. 5, the wheel assembly 42 includes a first wheel component 62, a second wheel component 64, and an attachment structure 65. The attachment structure 65 includes a bottom surface 66 and a rear member 82. The bottom surface 66 substantially conforms with a bottom surface 103 (FIG. 6) of header 10. In other words, the bottom surface 66 of the attachment structure 65 is substantially flush with or does not fall below the bottom surface 103 of the header 10. The rear member 82 may be a rear frame member extending between the lower beam 20 and the upper beam 18 (FIG. 1). In one embodiment, the attachment structure 65 is attached to a pre-existing header 10. In another embodiment, the header 10 is manufactured to accept the attachment structure 65.

The first wheel component 62 includes a first wheel 70, a first swing arm 72, and a first linkage 76. The first swing arm 72 includes a first end 73 that is pivotally attached to the attachment structure 65 at a first attachment point 68. The first swing arm 72 further includes a second end 74 (FIG. 8) that is attached to the first wheel 70. The first linkage 76 includes a first end 78 (FIG. 8) that is pivotally attached to the first swing arm 72. The first linkage 76 further includes a second end 80 that is pivotally attached to a rear member 82 of frame 12 or is directly attached to arm 86.

Figure 8:
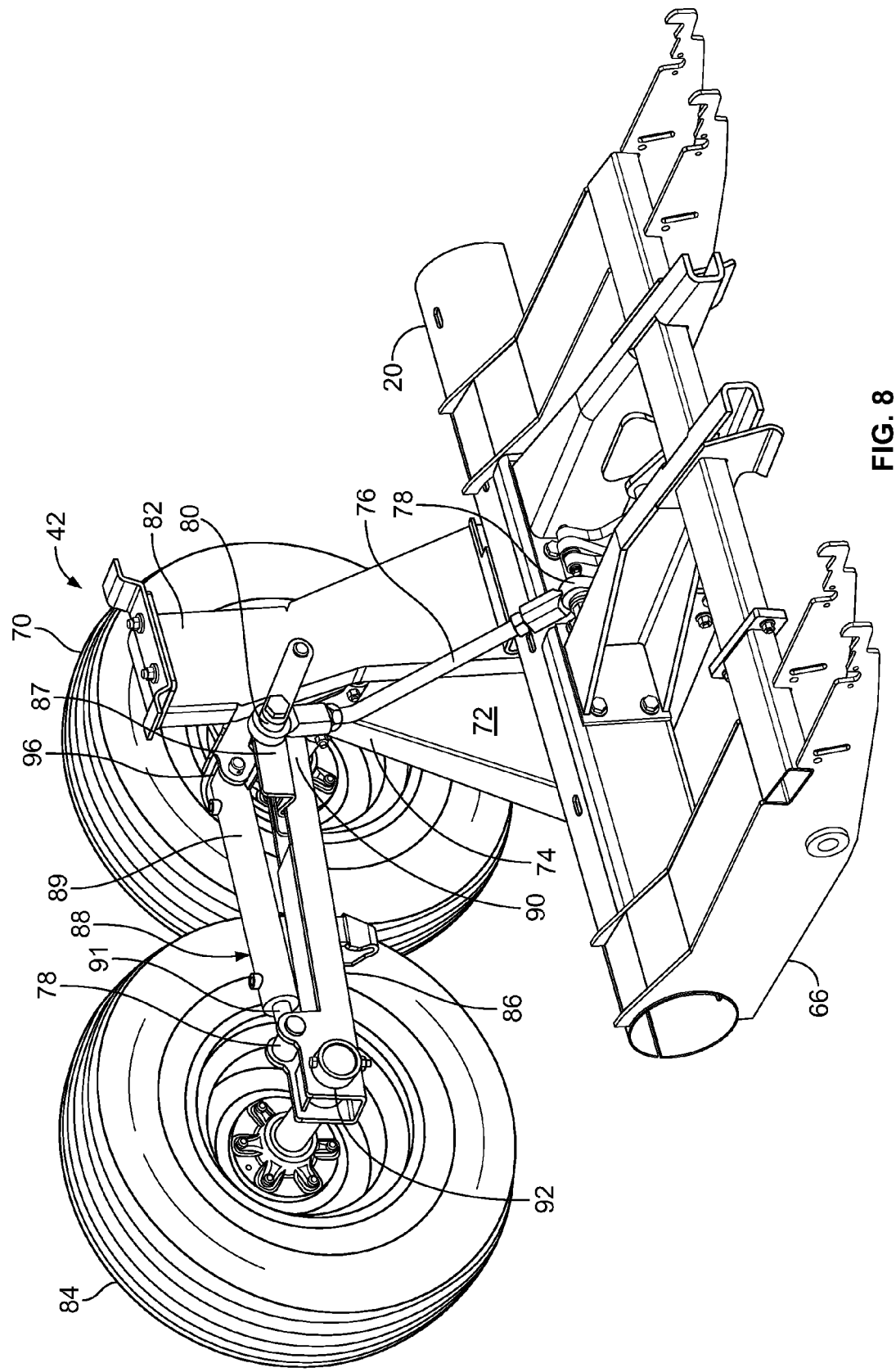
FIG. 8 is the partial cut away view of the wheel assembly of FIG. 5 rotated to a stored position in a harvest configuration.

The second wheel component 64 includes a second wheel 84, a second swing arm 86, and a second linkage 88. The second swing arm 86 includes a first end 90 (FIG. 8) pivotally attached to the rear member 82 at a second attachment point 87 (FIG. 8). The first end 90 of the second swing arm 86 is also pivotally attached to the second end 80 of the first linkage 76. The second swing arm 86 further includes a first end 92 (FIG. 8) that is attached to the second wheel 84.

The second linkage 88 includes a second linkage housing 89 and a second linkage extension member 91. The second linkage extension member 91 is extendable and retractable from the second linkage housing 89 to lengthen or shorten, respectively, the second linkage 88. The second linkage extension member 91 includes a first end 78 (FIG. 8) pivotally attached proximate to the first end 92 second swing arm 86. The second linkage housing 89 includes a second end 96 pivotally attached to a rear member 82 of frame 12 (FIG. 1). In one embodiment, the second linkage 88 is an extendable hydraulic device that extends and retracts axially by actuating the extendable hydraulic device. As can be seen in FIG. 5, the second linkage 88 is shown extended and the wheel assembly 42 is in a transport configuration.

Figure 6:
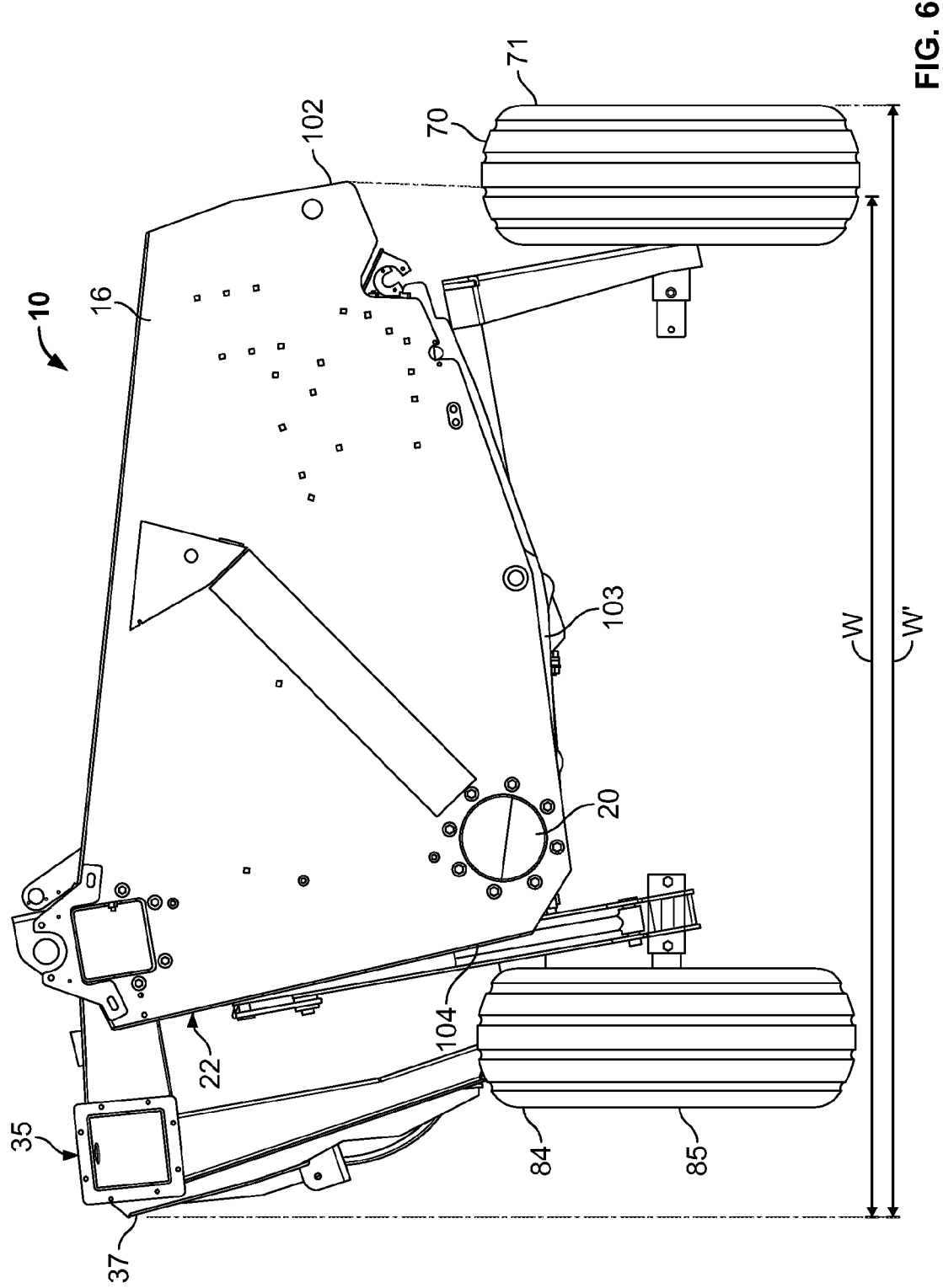
FIG. 6 is an end view of the harvest header of FIG. 1 without the optional equipment.

FIG. 6 is an end view of the header 10 of FIG. 1 in a transport configuration shown without the optional pivot wheel 46 and jack stand 48. As can be seen in FIG. 6, the header 10 further includes front edge 102, bottom surface 103, and a rear edge 104. The header 10 has a primary width W between the front edge 102 and the rear surface 37 of the attachment frame 35. The header 10 also has a transport width W' between the outside surface 71 of first wheel 70 and the rear surface 37 of attachment frame 35. When the header 10 is in a transport configuration, the first wheel 70 is disposed substantially underneath the front edge 102, or in other words, the first wheel 70 is disposed substantially underneath the header 10 and extends partially beyond the front edge 102. In another embodiment, the first wheel 70 may be disposed underneath or beyond the front edge 102. In the transport configuration shown in FIG. 6, the second wheel 84 is disposed substantially rearward of the rear wall 22 and extends below the bottom surface 103. In another embodiment, the second wheel is disposed substantially rearward of and underneath the rear wall 22.

In another embodiment wherein the attachment frame 35 is approximately in the plane of the frame 12, the header 10 has a primary width W between the rear surface 22 and the front edge 102, and a transport width W' between the outside surface 71 of the first wheel 70 and an outside surface 85 of second wheel 84.

Figure 7:
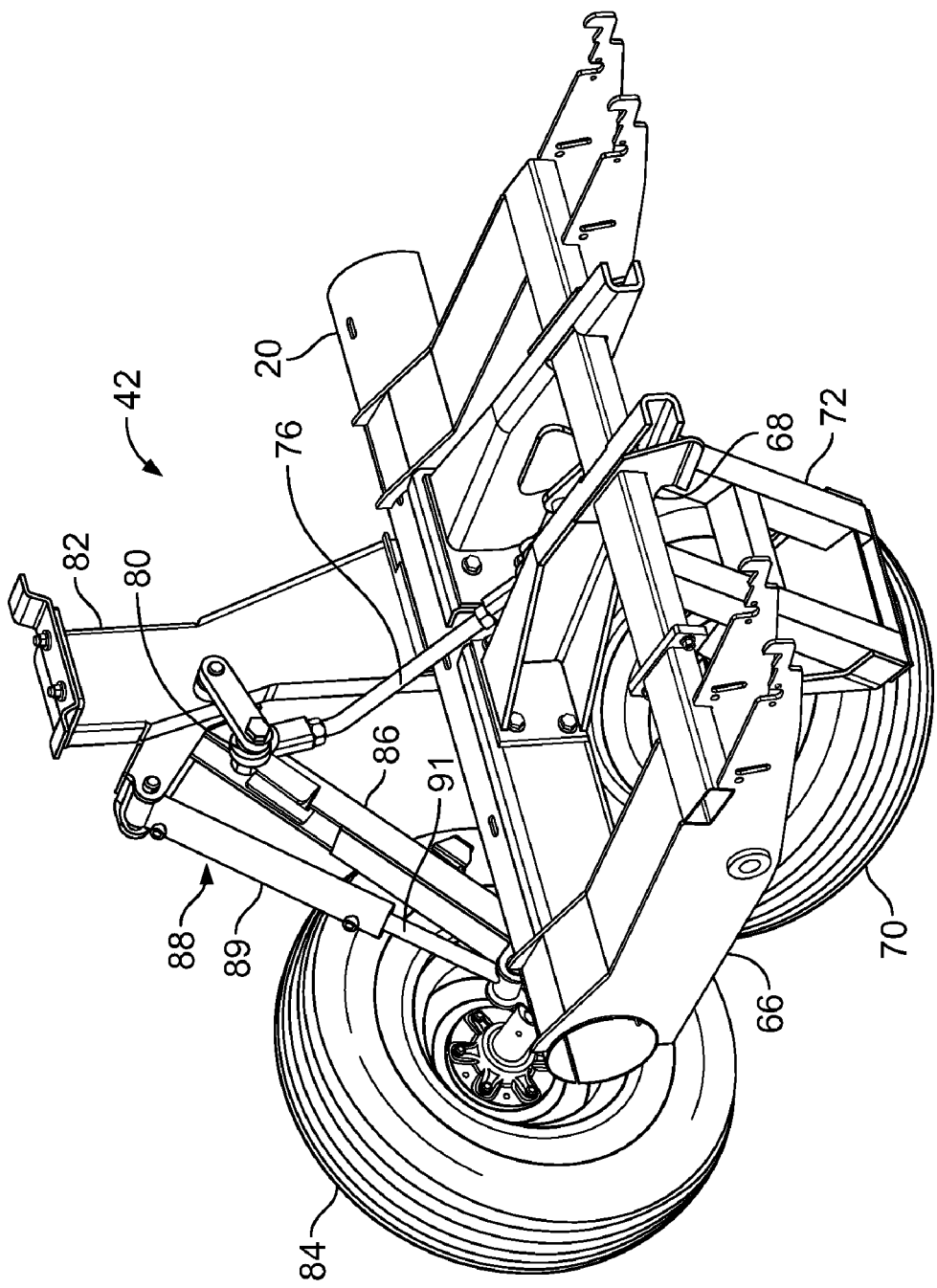
FIG. 7 is the partial cut away view of the wheel assembly of FIG. 5 partially rotated to a stored position.

FIG. 7 shows the wheel assembly 42 of FIG. 5 in a partially retracted position. As can be seen in FIG. 7, the second linkage 88 has been partially retracted, or in other words, the second linkage extension member 91 has been partially retracted into the second linkage housing 89 to shorten the length of the second linkage 88. The second linkage 88 has been partially refracted to rotate the second swing arm 86 about its pivotal connection point (not shown) with the rear member 82 to move the second wheel 84 closer to the rear wall 22 (FIG. 1). The rotation of the second swing arm 86 moves the first linkage 76 in a direction to rotate the first swing arm 72 about its pivotal connection with the attachment structure 65 to bring the first wheel underneath the header 10.

FIG. 8 shows wheel assembly 42 of FIG. 5 in a fully retracted position. As can be seen in FIG. 8, the second linkage 88 has been fully retracted, or in other words, the second linkage extension member 91 has been substantially retracted into the second linkage housing 89, shortening the length of the second linkage 88 and rotating the second wheel 84 to a stored position behind, adjacent and proximate to rear wall 22 (FIG. 1). Retracting the second linkage 88 also further moves the first linkage 76 to further rotate the first swing arm 72 into a position underneath and proximate to the lower beam 20, with the first wheel 70 into a stored position behind, adjacent and proximate to rear wall 22.

The swing arm 42 may include additional pins, bolts, latches or other attachment devices (not shown) to lock, secure or position the first and second wheel assemblies in a harvest or transport configuration.

Figure 9:
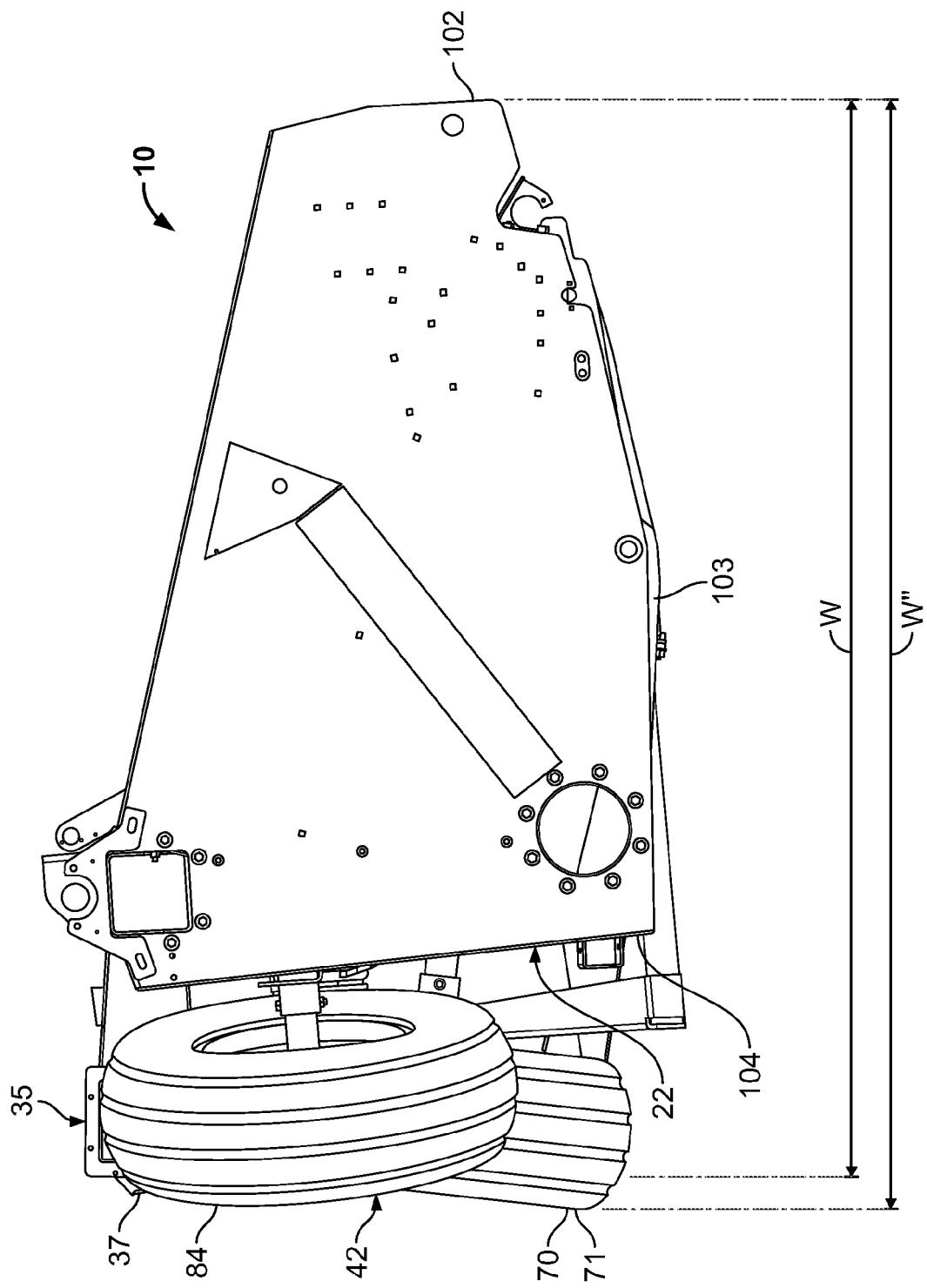
FIG. 9 is the end view of FIG. 6 having the wheel assembly rotated to a stored position.
Figure 10:
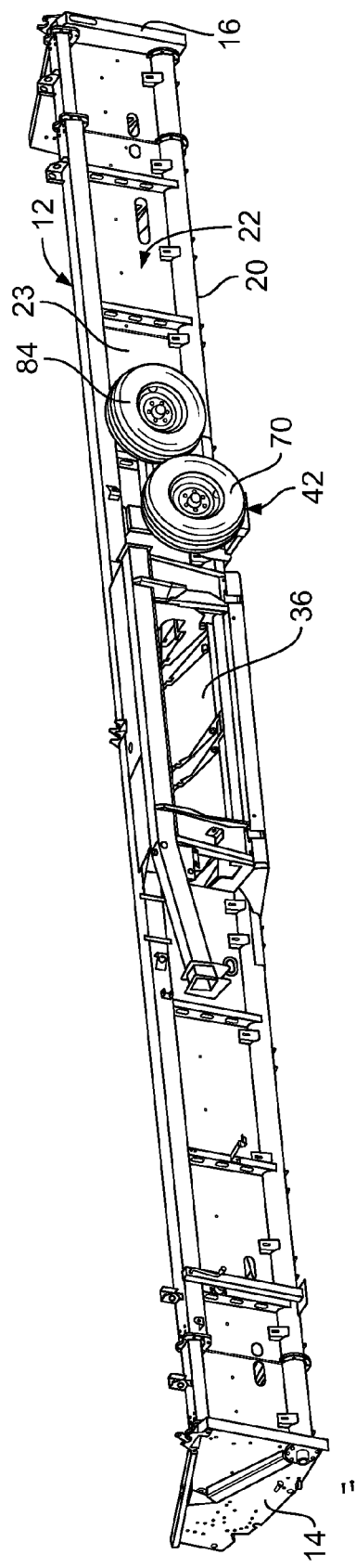
FIG. 10 is the rear perspective view of FIG. 1 without the optional equipment and the wheel assembly rotated to a stored position.

FIGS. 9 and 10 show the header 10 having the wheel assembly 42 fully retracted as shown in FIG. 8 and stored in a harvest configuration. As can be seen in FIGS. 9 and 10, the first and second wheels 70, 84 are stored and positioned behind, rearward, adjacent and proximate to the rear wall 22 and above the bottom surface 103. In another embodiment, another wheel assembly 42 is present between the opening 36 and the first end 14, and the wheels from the another wheel assembly 42 would also be stored and positioned behind, rearward, adjacent and proximate to the rear wall 22 and above the bottom surface 103 when in a harvest configuration.

As can be seen in FIG. 9, the header 10 has a harvest width W" between the outside surface of first wheel 71 and front edge 102. The harvest width W" is about equal to or approximately the same as the primary width W of the header. The terms "about equal" and "approximately the same" is defined for this disclosure to be less than about 2 inches. In another embodiment, the difference between the primary width W and the harvest width W" is less than or equal to about 24 inches. In another embodiment, the difference between the primary width W and the harvest width W" is less than or equal to about 18 inches. In another embodiment, the difference between the primary width W and the harvest width W" is less than or equal to about 12 inches. In another embodiment, the difference between the primary width W and the harvest width W" is less than or equal to about 6 inches. In yet another embodiment, the difference between the primary width W and the harvest width W is about zero inches.

Figure 11:
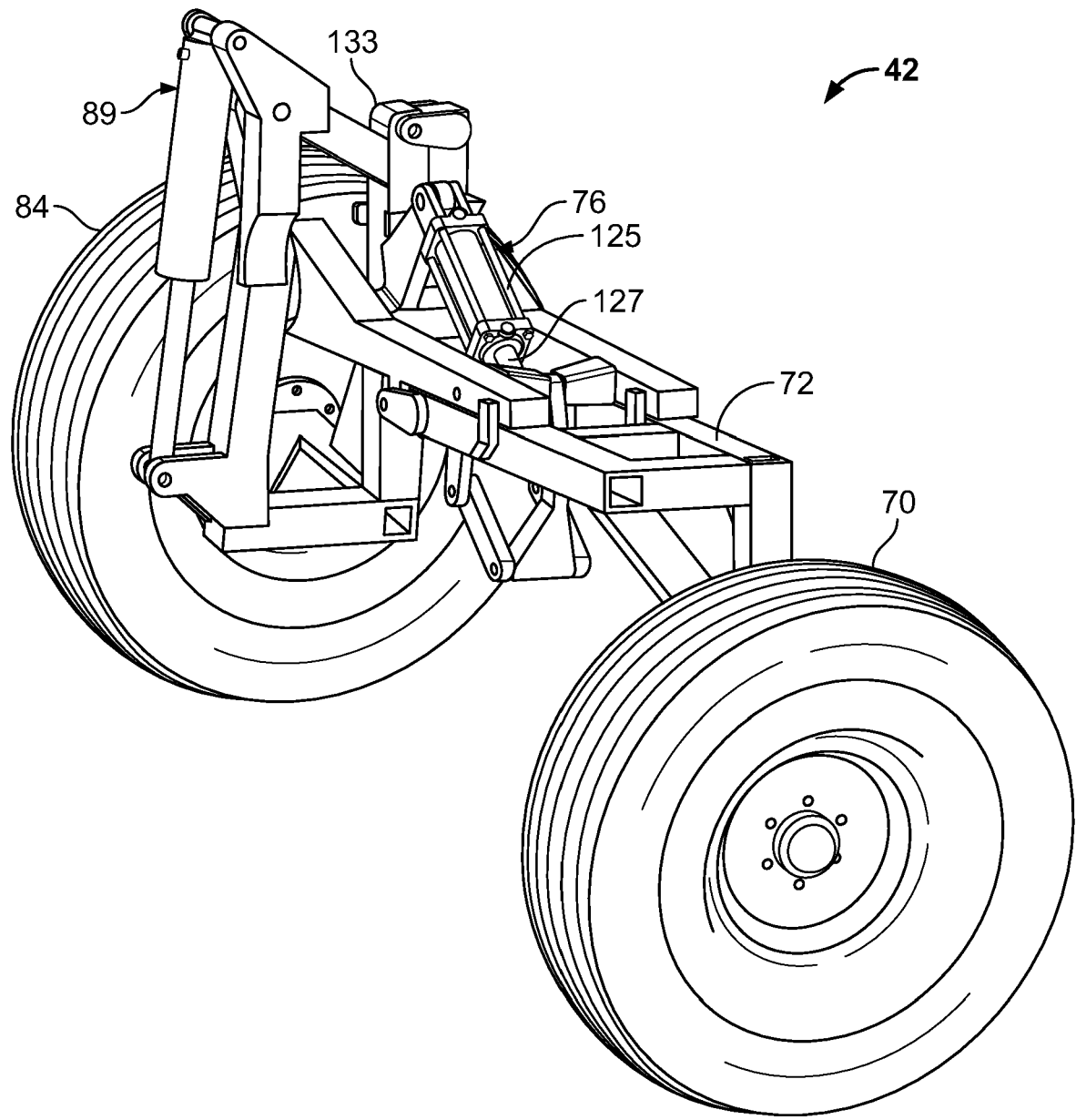
FIG. 11 is a partial cut away view of another embodiment of a wheel assembly of the present invention.
Figure 12:
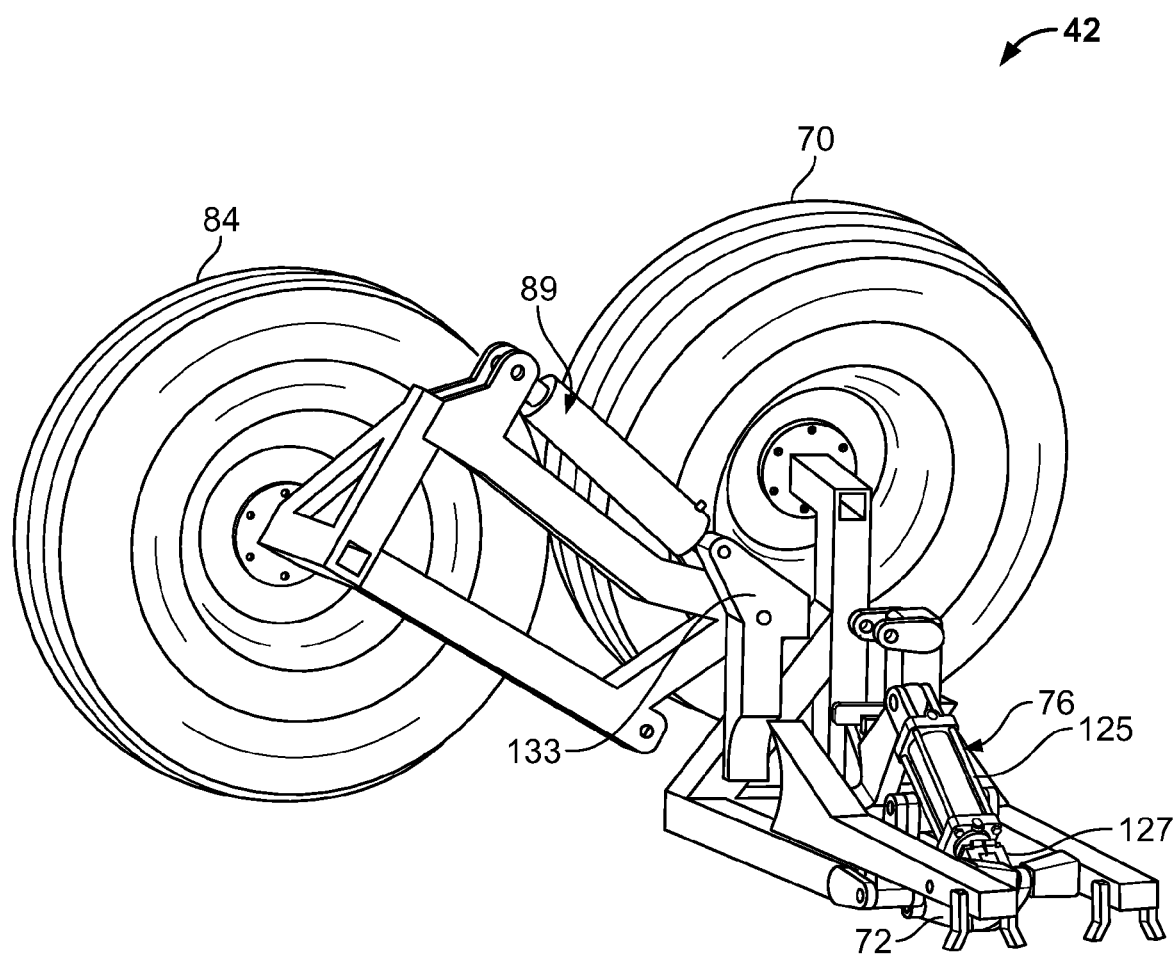
FIG. 12 is the partial cut away view of the wheel assembly of FIG. 11 rotated to a stored position in a harvest configuration.

FIGS. 11 and 12 show another embodiment of wheel assembly 42 in a transport and harvest configuration, respectively. In this embodiment, the first linkage 76 is a hydraulic member including a first linkage housing 125 and a first linkage extension member 127. The first linkage 76 operates similarly to the second linkage 89 to extend and retract to increase the length of the first linkage 76. The first linkage 76 includes a first end 78 pivotally attached to the first swing arm 72 and a second end 80 pivotally attached to a frame support member 133. In FIG. 11, the first linkage extension member 127 is extended, and the wheel assembly 42 is in a transport configuration. In FIG. 12, the first linkage extension member 127 is retracted, and the wheel assembly is in a harvest configuration. In contrast to the wheel assembly 42 embodiment discussed above that physically links the movement of the first linkage 76 to the second linkage 89 through the second swing arm 86, the wheel assembly 42 of this embodiment does not physically link the first and second linkages 76, 89 through the second swing arm 86. In this embodiment, the first and second linkages 76, 89 may be operated independently. In another embodiment, the hydraulics (not shown) that power the first and second linkages 76, 89 may be independently or dependently controlled to extend and retract the first and second linkages 76, 89.

In yet another embodiment, both the first linkage 76 and the second linkage 89 are not extendable, in other words, are similar to the first linkage 76 shown in FIG. 5, and provide a mechanical assist to the rotation of the first and second swing arms 72, 89, respectively. In yet another embodiment, the first and second linkages 76, 89 are omitted, and the first and second swing arms 72, 89 are manually rotated.

The transport system of the present disclosure has been described and shown in the context of a header for a combine. The transport system can, however, be used in other implements that have a great width during field use. Planters and tillage implements are two examples of wide implements for which special provisions are needed for transport of the implement on a road. The transport system of the present disclosure can be integrated into these and other implements, without departing from the scope of the present disclosure.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A harvest header having a harvest configuration and a transport configuration, comprising:
    a first end;
    a second end;
    a frame extending between the first end and the second end;
    a rear wall supported by the frame and extending between the first end and the second end; and
    a wheel assembly attached to the frame;
        the wheel assembly comprising:
            a first wheel component;
            a second wheel component; and
            an attachment structure for attaching the first wheel component and the second wheel component to the frame;
        the first wheel component comprising:
            a first swing arm having a first end attached to a first wheel and a second end pivotally attached to the attachment structure at a first attachment point; and
            a first linkage comprising a first end pivotally attached to the first swing arm and a second end pivotally attached to the frame;
        the second wheel component comprising:
            a second swing arm having a first end attached to a second wheel and a second end pivotally attached to the frame at a second attachment point; and
            a second linkage comprising a first end pivotally attached proximate the first end of the second swing arm and a second end pivotally attached to the frame;
        wherein the first wheel component and second wheel component are configured to rotate about the first attachment point and the second attachment point, respectively, to position the first wheel and the second wheel, respectively, proximate the rear wall in a transport configuration, wherein the axis of rotation of the first attachment point is substantially perpendicular with the axis of rotation of the second attachment point.

2. The harvest header of claim 1, wherein the header has a header width and a harvest width in the harvest configuration, and wherein the harvest width is approximately equal to the header width.

3. The harvest header of claim 1, wherein the second swing arm is rotated to a transport position by retracting the second linkage.

4. The harvest header of claim 1, wherein the second swing arm is rotated to a harvest configuration by extending the second linkage.

5. The harvest header of claim 1, wherein the second swing arm is an extendable hydraulic device.

6. The harvest header of claim 1, wherein the second end of the first linkage is further pivotally attached to the second swing arm.

7. The harvest header of claim 1, further comprising:
    a pivot wheel assembly attached to the harvest header between the wheel assembly and the first end, of the header.

8. The harvest header of claim 7, wherein the pivot wheel assembly attached to the first end of the header, is a second wheel assembly.

9. A wheel assembly comprising:
    a first wheel component;
    a second wheel component; and
    an attachment structure for attaching the first wheel component and the second wheel component to a frame;
    the attachment structure comprising a rear member and a bottom surface;
    the first wheel component comprising:
        a first swing arm having a first end attached to a first wheel and a second end pivotally attached to the attachment structure at a first attachment point; and
        a first linkage comprising a first end pivotally attached to the first swing arm and a second end pivotally attached to the rear member;
    the second wheel component comprising:
        a second swing arm having a first end attached to a second wheel and a second end pivotally attached to the rear member at a second attachment point; and
        a second linkage comprising a first end pivotally attached proximate the second end of the second swing arm and a second end pivotally attached to the rear member;
    wherein the first wheel component and second wheel component are configured to rotate about the first attachment point and the second attachment point, respectively, to position the first wheel and the second wheel, respectively, above the bottom surface when the second swing arm is rotated to a transport position, wherein the axis of rotation of the first attachment point is substantially perpendicular with the axis of rotation of the second attachment point.

10. The wheel assembly of claim 9 wherein the second swing arm is rotated to a transport position by retracting the second linkage.

11. The wheel assembly of claim 9 wherein the second swing arm is an extendable hydraulic device.

12. The wheel assembly of claim 9 wherein the second end of the first linkage is further pivotally attached to the second swing arm.

13. The wheel assembly of claim 9 wherein the first linkage is an extendable hydraulic device.

* * * * *